(12) United States Patent
Takahashi et al.

(10) Patent No.: US 7,808,576 B2
(45) Date of Patent: Oct. 5, 2010

(54) LIQUID CRYSTAL DISPLAY DEVICE

(75) Inventors: Yoshiaki Takahashi, Chiba (JP);
Hiroshi Nakamoto, Chiba (JP);
Hidehiro Hanada, Ichihara (JP)

(73) Assignees: Hitachi Displays, Ltd., Chiba-Ken (JP);
Hitachi Display Devices, Ltd,
Chiba-Ken (JP)

( * ) Notice: Subject to any disclaimer, the term of this patent is extended or adjusted under 35 U.S.C. 154(b) by 425 days.

(21) Appl. No.: 11/839,656

(22) Filed: Aug. 16, 2007

(65) Prior Publication Data

US 2008/0043171 A1    Feb. 21, 2008

(30) Foreign Application Priority Data

Aug. 18, 2006    (JP)    ............... 2006-222883

(51) Int. Cl.
*G02F 1/1335* (2006.01)
*G02F 1/1345* (2006.01)

(52) U.S. Cl. ................... 349/65; 349/62; 349/149; 349/150; 362/615; 345/84; 257/88

(58) Field of Classification Search ......... 349/61, 349/62, 65, 150; 362/615; 354/84; 257/88
See application file for complete search history.

(56) References Cited

U.S. PATENT DOCUMENTS 6,565,249 B2 * 5/2003 Toyoda et al. ............ 362/560
6,981,791 B2 * 1/2006 Higashiyama ............. 362/600
6,981,792 B2 * 1/2006 Nagakubo et al. ......... 362/600
7,101,073 B2 * 9/2006 Li ............................. 362/621
2003/0164903 A1 * 9/2003 Saito et al. ................. 349/58

FOREIGN PATENT DOCUMENTS

| JP | 2004-186131 | 7/2004 |
| JP | 2004-286777 | 10/2004 |
| JP | 2008-047291 | 2/2008 |
| WO | WO 2006/043344 | 4/2006 |

\* cited by examiner

*Primary Examiner*—Julie-Huyen L Ngo
(74) *Attorney, Agent, or Firm*—Antonelli, Terry, Stout & Kraus, LLP.

(57) ABSTRACT

The present invention provides a backlight of a liquid crystal display device having an inclination surface on a light guide plate and preventing a breakage of a liquid crystal panel, wherein light which leaks from the inclination surface is made to return to the light guide plate and the adhesiveness of the light guide plate and a flexible printed circuit board is increased. In a liquid crystal display device having a backlight which radiates light to a liquid crystal panel, LEDs are formed on a light guide plate formed on the backlight as light emitting elements. Between the plurality of light emitting elements, a projecting portion of the light guide plate is formed, and a reflection member is formed on an adhesive sheet which adheres a projection member and a flexible printed circuit board to each other. By arranging the reflective member and the cushion member close to an inclination surface, light from the inclination surface is made to return to a light guide plate side, and an external force from the outside can be alleviated by a cushion member.

8 Claims, 13 Drawing Sheets

LIQUID CRYSTAL DISPLAY DEVICE

BACKGROUND OF THE INVENTION

1. Field of the Invention

The present invention relates to a light source of a non-self-luminous display device, and more particularly to a liquid crystal display device having a backlight which includes a light guide plate and uses an LED as a light source.

2. Background Art

Recently, the liquid crystal display device has been popularly used as a display device. Particularly, the liquid crystal display device is used as a display part of portable equipment because of a reduced thickness, a reduced weight and small electric power consumption.

However, the liquid crystal display device is not self-luminous and hence, the display device requires an illumination means. In general, as a lighting device which is used for the liquid crystal display device, a flat lighting device referred to as a backlight is popularly used. Conventionally, although a cold cathode fluorescence light tube has been used as a light emitting element (also referred to as a light source) of the backlight, an LED (light emitting diode) has been also recently used as the light emitting element.

The backlight includes a plate-like light guide plate. The light guide plate is made of a light-transmissive resin material or the like. The light which is incident on the light guide plate from the light emitting element transmits the inside of the light guide plate. Reflection and diffusion members such as grooves, projections or printed materials are formed on the light guide plate, and the light which transmits in the inside of the light guide plate is radiated toward a liquid-crystal-display-device side by the reflection and diffusion members.

In using an LED as the light emitting element, the LED is a point light source and hence, there arises a drawback that it is difficult to uniformly radiate light from the light guide plate. Accordingly, for example, JP-A-2004-286777 and the like propose a technique for uniformly diffusing light in the vicinity of the LED. That is, these documents disclose the constitution in which a light guide plate is formed along a side surface of the LED and the light is incident on the light guide plate from the side surface of the LED. Further, JP-A-2004-186131 discloses a light guide plate having two thicknesses.

SUMMARY OF THE INVENTION

In the backlight which uses the LED as the light source and uses a plurality of LEDs for increasing the brightness, the LEDs are arranged on a printed circuit board in a discrete manner. Accordingly, it has been difficult to accurately perform positioning of the LEDs and the light guide plate.

Further, in portable equipment on which a liquid crystal display device is mounted, thin-thickness-type equipment is desired, and such equipment is requested to restrict a thickness of the backlight. Along with the reduction of a thickness of the equipment, there also arises a drawback that a liquid crystal panel is easily broken due to an external force.

The present invention has been made in view of the above-mentioned drawbacks and it is an object of the present invention to provide a liquid crystal display device which can enhance the utilization efficiency of light, can reduce irregularities of radiation light, and can enhance the positioning accuracy of LEDs.

According to the present invention, there is provided a liquid crystal display device which includes a display panel, a backlight which radiates a light to the display panel, a light emitting element which is mounted on the backlight, a light guide plate on which the light from the light emitting element is incident, and a printed circuit board on which the light emitting element is mounted wherein a projecting portion is formed on a light incident surface of the light guide plate along a side surface of the light emitting element.

The printed circuit board on which the light emitting element is mounted is fixed to an upper surface of the projecting portion of the light guide plate using an adhesive material, and positioning of the light emitting element is performed with respect to the light guide plate.

Further, an inclination surface is formed toward a light radiation surface from a light incident surface, a thickness of the light radiation surface of the light guide plate is reduced and, at the same time, an optical sheet is arranged on the inclination surface.

By alleviating a force attributed to the inclination surface which is applied to the liquid crystal panel using the optical sheet, a strength for an external force is enhanced and, at the same time, by arranging a reflective member on the inclination surface, light which is leaked from the inclination surface is reflected and the leaked light is returned to the light-guide-plate side from the inclination surface and hence, it is possible to enhance the utilization efficiency of light.

By forming the projecting portion on a light incidence surface of the light guide plate, a light guide plate is arranged between the LEDs and hence, the light which is radiated in the side surface direction of the LED is made to be incident on the light guide plate thus increasing the light which is incident from between the LEDs whereby it is possible to reduce irregularities of light radiated from the light guide plate.

Further, by forming the inclination surface on the light guide plate, a thickness of the light radiation surface of the light guide plate may be set to a value equal to or less than a thickness of the LEDs thus realizing the reduction of thickness and, at the same time, it is possible to overcome a drawback which arises due to the provision of the inclination surface, that is, a drawback that it is difficult to adhere the printed circuit board which mounts the LEDs thereon to the light guide plate. That is, by allowing the printed circuit board to be adhered to the light guide plate in a state that the projecting portion is formed between the LEDs, it is possible to enhance positioning accuracy of the LEDs.

Further, by arranging the optical sheet on the inclination surface of the light guide plate, a gap which is generated attributed to the inclination surface is filled with the optical sheet thus preventing a rupture of the liquid crystal panel attributed to the external force.

Further, the reflective member is arranged on the inclination surface and hence, the light which is leaked from the inclination surface is returned to the light-guide-plate side thus enhancing the utilization efficiency of light.

In a liquid crystal display device including a liquid crystal panel and a flat lighting device which radiates light to the liquid crystal panel, a light guide plate which includes a light radiation surface and a bottom surface arranged to face the light radiation surface in an opposed manner is mounted on the flat lighting device.

Further, a side surface which intersects the light radiation surface or the bottom surface is formed on the light guide plate, a plurality of LEDs is arranged along a first side surface of the light guide plate, light of the LED is incident on the first side surface thus using the first side surface as a light incident surface of the light guide plate and, further, the LEDs are mounted on a printed circuit board. A projecting portion is formed on the first side surface in a state that the projecting portion projects between the LEDs and, further, an inclination surface is formed in a state that the inclination surface extends toward the light radiation surface of the light guide plate from the light incident surface of the light guide plate, and an optical sheet is arranged on the inclination surface. Positioning of the LED and the light guide plate is performed by applying an adhesive material to an upper surface of the projecting portion of the light guide plate so as to fix the light guide plate and the printed circuit board by adhesion, and a reflective member is arranged on the inclination surface.

DETAIL DESCRIPTION OF THE EMBODIMENTS

Figure 1:
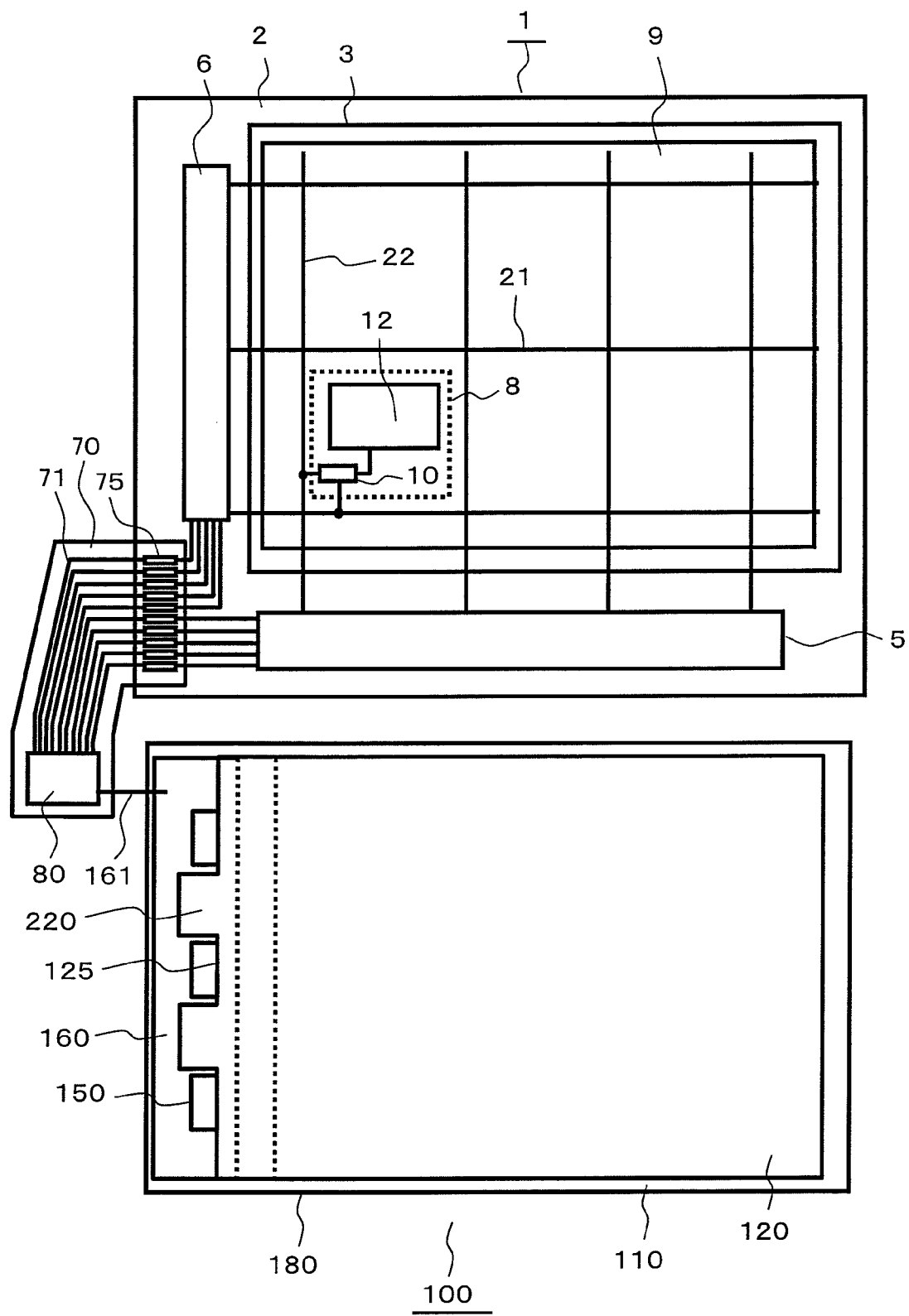
FIG. 1 is a block diagram showing the schematic constitution of a liquid crystal display device of an embodiment according to the present invention.

FIG. 1 is a plan view showing a liquid crystal display device 100 according to the present invention. The liquid crystal display device 100 is constituted of a liquid crystal panel 1, a backlight 110 and a control circuit 80. Signals and power source voltages necessary for a display by the liquid crystal display device 100 are supplied from the control circuit 80. The control circuit 80 is mounted on a flexible printed circuit board 70, and signals are transmitted to the liquid crystal panel 1 via lines 71 and terminals 75.

The backlight 110 is constituted of a light guide plate 120, LEDs 150 and a housing case 180. The backlight 110 is provided for radiating light to the liquid crystal panel 1. The liquid crystal panel 1 performs a display by controlling a transmission quantity or a reflection quantity of light radiated from the backlight 110. Here, the backlight 110 is mounted on a back surface side or a front surface side of the liquid crystal panel 1 in a stacked manner as viewed from a viewer. However, in FIG. 1, to facilitate the understanding of the constitution of the liquid crystal display device, the backlight 110 is illustrated in parallel to the liquid crystal panel 1.

The light guide plate 120 is formed in a substantially rectangular shape, and the LEDs 150 are arranged on a side surface of the light guide plate 120. Numeral 160 indicates a flexible printed circuit board which electrically connects the plurality of LEDs 150. The flexible printed circuit board 160 and the control circuit 80 are electrically connected with each other using a line 161.

A side surface 125 on which the LEDs 150 are arranged is referred to as a light incident surface or a light entrance surface, and light is incident on the light guide plate 120 from the light incident surface 125. Further, a projecting portion (also referred to as a convex portion) 220 is arranged between two neighboring LEDs 150. The detailed explanation of the projecting portions 220 are described later.

Next, the liquid crystal panel 1 is explained hereinafter. The liquid crystal panel 1 includes two substrates consisting of a TFT substrate 2 and a color filter substrate 3, and a liquid crystal composition is sandwiched between two substrates which overlap each other. Pixel electrodes 12 are formed in pixel portions 8 of the TFT substrate 2. Here, the liquid crystal panel 1 includes a large number of the pixel portions 8 in a matrix array. However, to avoid the drawing from becoming cumbersome, in FIG. 1, only one pixel portion 8 is illustrated. The pixel portions 8 which are arranged in a matrix array form a display region 9, and the respective pixel portions 8 play a role of pixels of a displayed image and form an image on the display region 9.

On the TFT substrate 2, gate signal lines (also referred to as scanning signal lines) 21 which extend in the X direction and are arranged in parallel in the Y direction in the drawing and drain signal lines (also referred to as video signal lines) 22 which extend in the Y direction and are arranged in parallel in the X direction in the drawing are provided, and the gate signal lines 21 and the drain signal lines 22 intersect each other. Further, the pixel portions 8 are formed in regions which are surrounded by the gate signal lines 21 and the drain signal lines 22.

A switching element 10 is provided to the pixel portion 8. A control signal is supplied to the pixel portion 8 from the gate signal line 21 so as to control an ON/OFF state of the switching element 10. When the switching element 10 is turned on, the video signal which is transmitted via the drain signal line 22 is supplied to the pixel electrode 12.

The drain signal lines 22 are connected to a drive circuit 5 and video signals are outputted to the drain signal lines 22 from the drive circuit 5. The gate signal lines 21 are connected to a drive circuit 6 and control signals are outputted to the gate signal lines 21 from the drive circuit 6. Here, the gate signal lines 21, the drain signal lines 22, the drive circuit 5 and the drive circuit 6 are formed on the same TFT substrate 2.

Further, the drive circuit 5, the drive circuit 6 and the control circuit 80 may also be formed on one semiconductor chip.

Figure 2A:
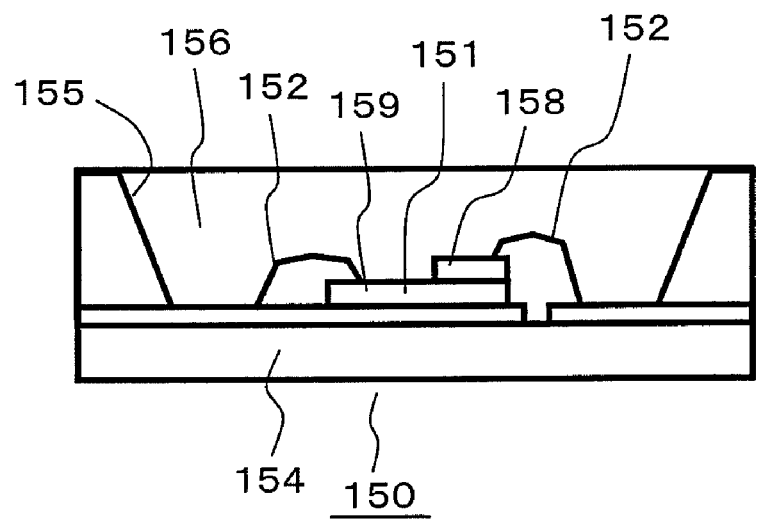
FIG. 2A and FIG. 2B are schematic views showing a light emitting diode of the liquid crystal display device of the embodiment according to the present invention.
Figure 2B:
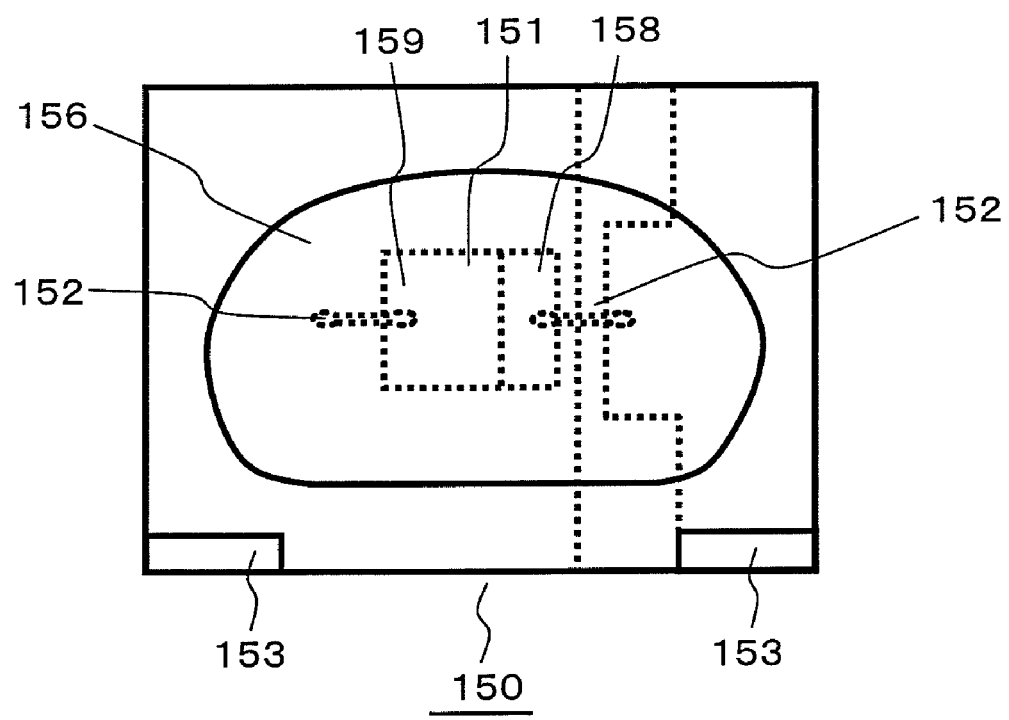

Next, FIG. 2A and FIG. 2B are schematic views of the LED 150 which constitutes a light emitting element, wherein FIG. 2A is a schematic cross-sectional view of the LED 150, and FIG. 2B is a front view of a light-emitting-surface-side of the LED 150.

The LED 150 is configured such that an LED chip 151 constituting a light emitting portion is mounted on a chip substrate 154. The LED chip 151 has a pn junction and light having a specific wavelength is radiated when a voltage is applied to the pn junction. A p electrode (anode) 158 is formed on a p-type semiconductor layer which forms the pn junction, and an n electrode (cathode) 159 is formed on an n-type semiconductor layer which forms the pn junction.

Wires 152 are connected to the p electrode 158 and the n electrode 159 respectively. With these wires 152, chip terminals 153 which are provided for connecting the LED 150 and the outside are electrically connected with the p electrode 158 and the n electrode 159.

A fluorescent light emitting portion 156 may be formed on a light radiation surface side of the LED chip 151. The fluorescent light emitting portion 156 has a function of converting a wavelength of light which is emitted from the LED chip 151. Here, numeral 155 indicates a reflection portion which reflects light frontwardly.

Figure 3A:
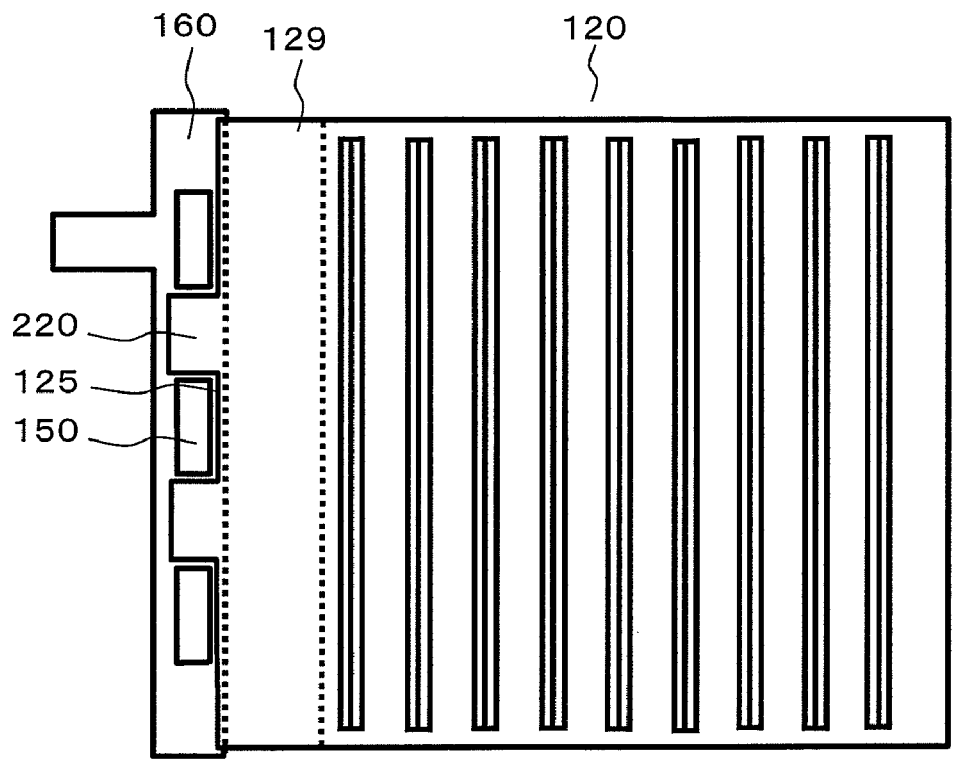
FIG. 3A and FIG. 3B are schematic views showing a light guide plate of the liquid crystal display device of the embodiment according to the present invention.
Figure 3B:
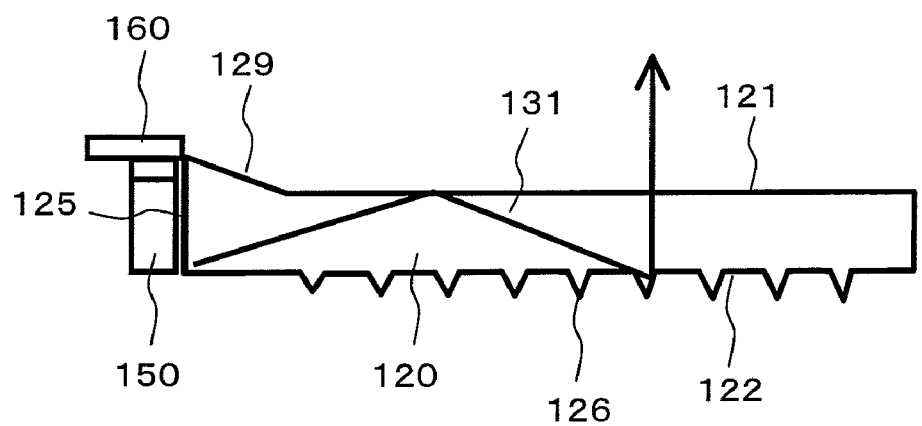

Next, FIG. 3A is a schematic plan view of the light guide plate 120, and FIG. 3B is a schematic side view of the light guide plate 120. As shown in FIG. 3A, the light guide plate 120 is formed in a rectangular shape and, as shown in FIG. 3B, the light guide plate 120 includes an upper surface 121 and a lower surface 122. The light guide plate 120 is made of a material such as an acrylic resin which allows light to pass therethrough, and the light guide plate 120 is formed in a plate shape and has a thickness of 1.0 mm to 0.2 mm. Here, to facilitate the understanding of the structure of the light guide plate 120, FIG. 3A shows a plan view of the light guide plate 120 as viewed from a back surface side of the light guide plate 120.

In FIG. 3B, although a cross section of the light guide plate 120 is formed into a substantially rectangular shape, an inclination surface 129 is formed on the light guide plate 120 in a state that the inclination surface 129 extends toward the light radiation surface 121 from the light incident surface 125. The inclination surface 129 is effectively used when a thickness of the LED 150 is larger than a thickness of the light radiation surface 121, and the inclination surface 129 guides light which is incident from the light incident surface 125 having a thickness thereof larger than the thickness of the light radiation surface 121 so as to direct the light to the light radiation surface 121.

FIG. 3A and FIG. 3B show a positional relationship of the light guide plate 120, the LED 150 and the flexible printed circuit board 160. The light incident surface 125 is arranged on at least one side of the light guide plate 120, and in the vicinity of the light incident surface 125, a plurality of LEDs 150 is arranged. The LEDs 150 are arranged below the flexible printed circuit board 160 along the light incident surface 125.

An adhesive sheet 190 (not shown in the drawing) is mounted on a light-guide-plate-120 side of the flexible printed circuit board 160. By adhering and fixing the flexible printed circuit board 160 to the light guide plate 120 using the adhesive sheet 190, the LEDs 150 can be positioned with respect to the light incident surface 125.

Here, the inclination surface 129 is arranged close to the light incident surface 125 and, further, the flexible printed circuit board 160 possesses the flexibility. However, since a portion of the flexible printed circuit board 160 which overlaps the inclination surface 129 is short, it is difficult to fix the flexible printed circuit board 160 to the inclination surface 129 using the adhesive sheet 190 by bending the flexible printed circuit board 160. Further, there exists a possibility that positions of the LEDs 150 are moved after being mounted due to a bending stress. Accordingly, projecting portions 220 are formed on the light guide plate 120 along side surfaces of the LEDs 150, and the adhesive sheet 190 is arranged between the projecting portions 220 and the flexible printed circuit board 160.

Next, the explanation is made with respect to light 131 which is radiated from the LED 150 in conjunction with FIG. 3B. The light 131 which is radiated from the LED 150 is incident on the light guide plate 120 from the light incident surface 125. Since a refractive index of the light guide plate 120 is larger than a refractive index of air, light which arrives at the light incident surface 125 with an angle larger than a specific angle with respect to the normal direction of the light incident surface 125 is reflected, and light which arrives at the light incident surface 125 with an angle smaller than the specific angle intrudes into the inside of the light guide plate 120.

Further, the upper surface 121 and the lower surface 122 of the light guide plate 120 are arranged to be substantially orthogonal to the light incident surface 125, and grooves 126 having a V-shaped cross section are formed in the lower surface 122 as reflection portions. The light which is incident on the inside of the light guide plate 120 advances the inside of the light guide plate 120 while repeating the total reflection with respect to the upper surface 121 and the lower surface 122 of the light guide plate 120. A portion of the light which advances the inside of the light guide plate 120 is reflected toward the upper surface 121 side by the grooves 126 formed in the lower surface 122 and is radiated from the upper surface 121. Here, although the explanation has been made by taking the grooves 126 having a V-shaped cross section as one example of the reflection portions, the reflective portions may be formed in any shape provided that the reflection portions can direct the light which advances the light guide plate toward the upper surface 121 side. For example, white dots which are formed by printing or the like may be used as the reflection portions.

Figure 4A:
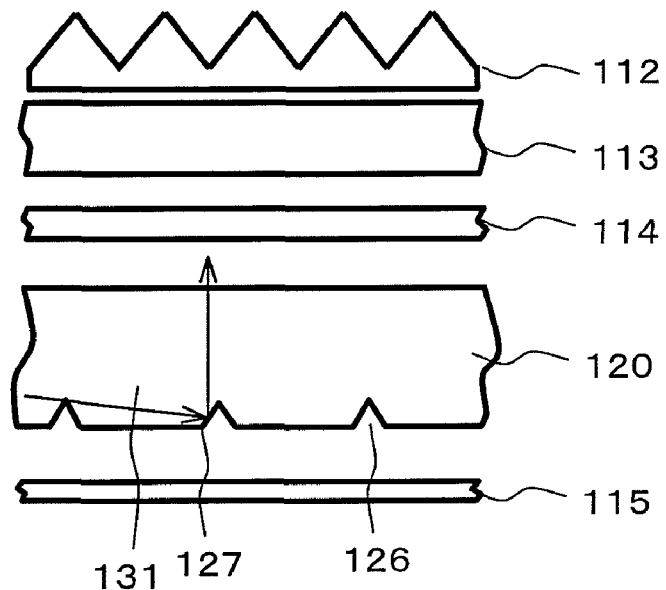
FIG. 4A and FIG. 4B are schematic cross-sectional views showing light which propagates in the light guide plate of the liquid crystal display device of the embodiment according to the present invention.
Figure 4B:
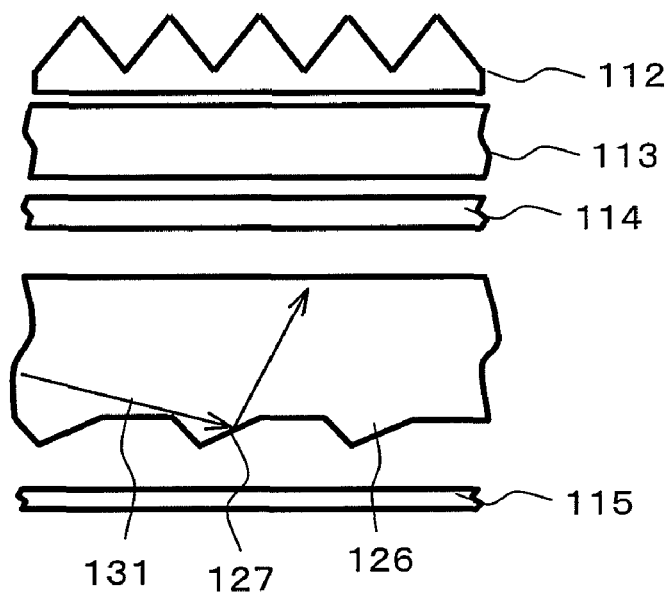

Next, the explanation is made with respect to the light which is reflected by the grooves 126 in conjunction with FIG. 4A and FIG. 4B. FIG. 4A shows a case in which the grooves 126 project inwardly, and FIG. 4B shows a case in which the grooves 126 project outwardly. The groove 126 includes reflection surfaces (also referred to as inclination surfaces) 127, wherein the reflection surface 127 makes an angle of 2 to 35 degrees with respect to the lower surface 122. The light which is reflected by the reflection surface 127 is reflected toward the upper surface 121 of the light guide plate 120, and an angle of the reflected light with respect to the upper surface 121 is set to an angle which enables the radiation of light from the upper surface 121.

Further, as shown in FIG. 4B, there may be a case in which the light which is reflected on the reflection surface 127 is radiated while expanding outwardly with a large angle with respect to the direction perpendicular to the upper surface 121 of the light guide plate 120 (an obtuse angle with respect to the upper surface 121). Accordingly, on the light guide plate 120, a prism sheet 113 and a prism sheet 112 are formed to reflect the light which advances to the outside to a liquid crystal display panel (not shown in the drawing) side. Here, numeral 114 indicates a diffusion plate, and numeral 115 indicates a reflective sheet.

Figure 5A:
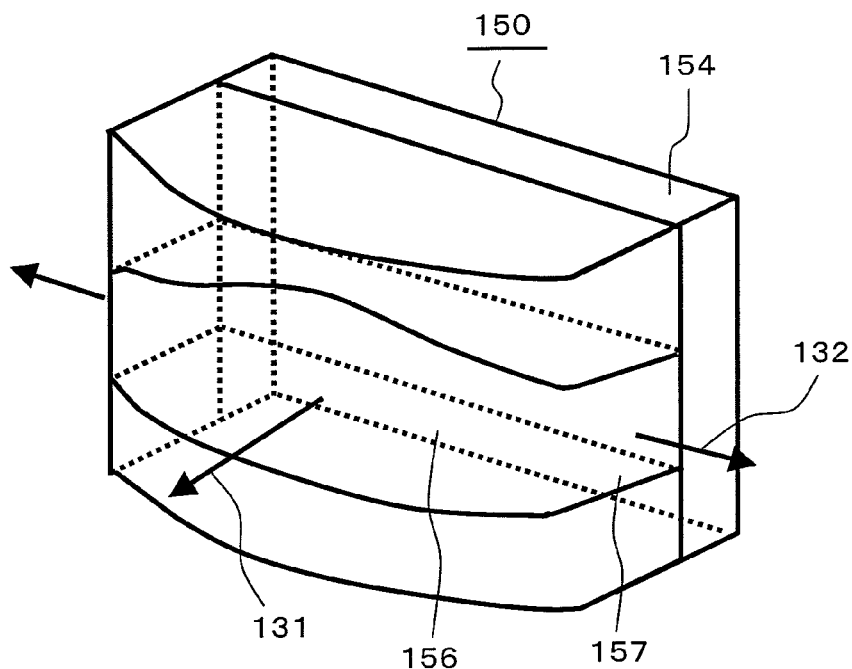
FIG. 5A and FIG. 5B are schematic views showing a light emitting diode of the liquid crystal display device of the embodiment according to the present invention.
Figure 5B:
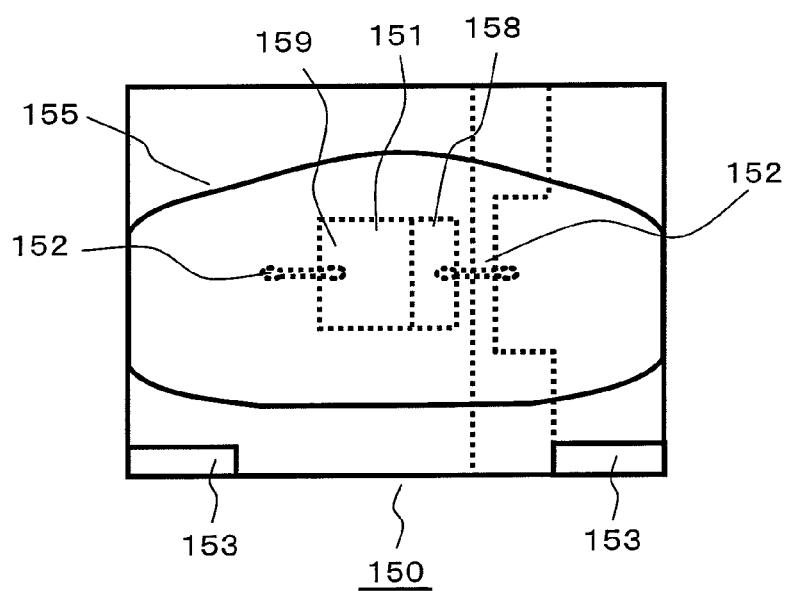

Next, the LED 150 which radiates light from side surfaces thereof is explained in conjunction with FIG. 5A and FIG. 5B. The LED 150 shown in FIG. 5A and FIG. 5B forms an opening 157 in side surfaces of a fluorescent light emitting portion 156, and light 132 is also radiated from the side surfaces of the LED 150. Accordingly, the light 132 is incident on the light guide plate 120 through the above-mentioned projecting portions 220 of the light guide plate 120.

By allowing the light to be incident on the light guide plate 120 through the projecting portions 220, the light can be incident on the light guide plate 120 also from a gap between two neighboring LEDs 150. Accordingly, it is possible to reduce a dark portion which is formed between two neighboring LEDs 150.

Figure 6:
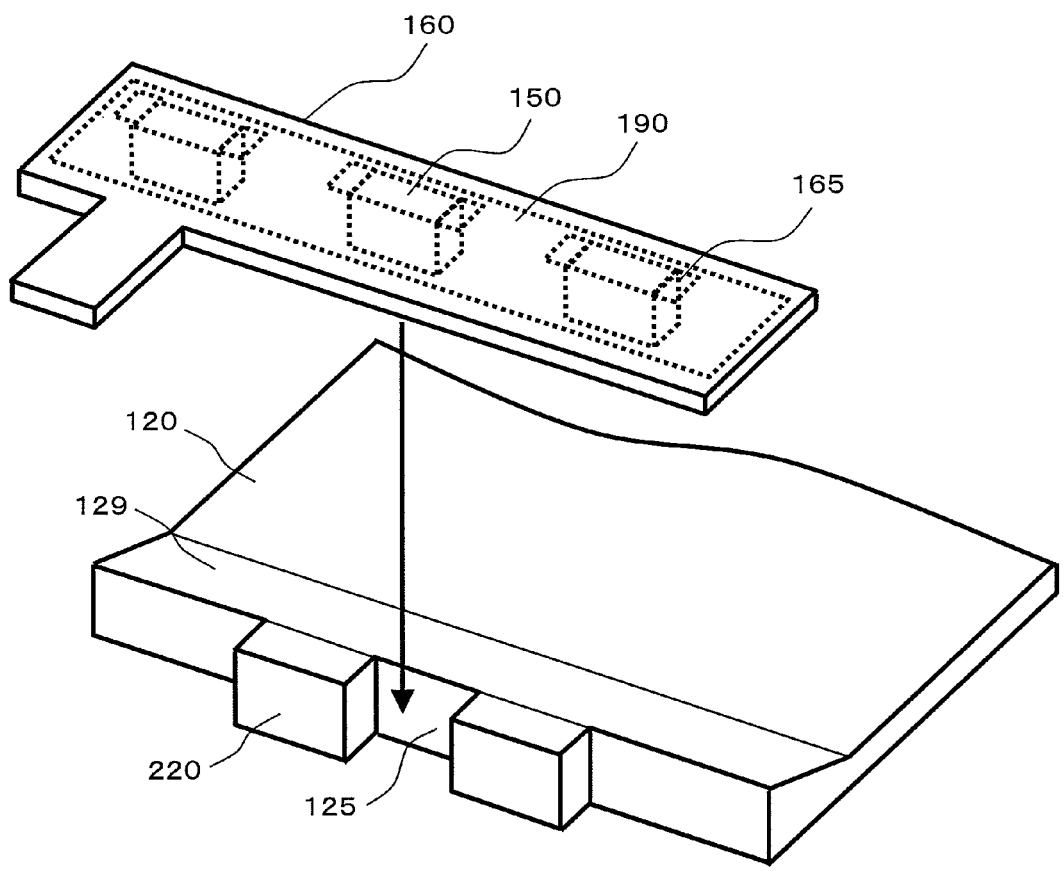
FIG. 6 is a schematic view showing a mounting method of a flexible printed circuit board of the liquid crystal display device of the embodiment according to the present invention.

Next, a step for assembling the flexible printed circuit board 160 which mounts the LEDs 150 thereon to the light guide plate 120 is explained in conjunction with FIG. 6. First of all, the LEDs 150 are mounted on the flexible printed circuit board 160. Connection pads 165 are mounted on the flexible printed circuit board 160. The LEDs 150 and the connection pad 165 are connected with each other using solder or the like. Here, although lines which supply power to the respective LEDs 150 are formed on the flexible printed circuit board 160, the lines are omitted in FIG. 6.

The adhesive sheet 190 is mounted on the flexible printed circuit board 160 on which the LEDs 150 are mounted. The flexible printed circuit board 160 is adhered to the light guide plate 120 using the adhesive sheet 190. If the positions of the LEDs 150 are easily moved with respect to the light incident surface 125 of the light guide plate 120 due to vibrations or the like, brightness of light which is incident on the light guide plate 120 is changed. The change of brightness of light which is incident from the light source decreases the display performance. Accordingly, the flexible printed circuit board 160 is fixed to the light guide plate 120 using the adhesive sheet 190 or the like.

The adhesive sheet 190 has the multi-layered structure in which an adhesive member is mounted on a resin-made substrate. As described later, a reflection portion of the adhesive sheet 190 may be made of a paint or a material corresponding to silver.

On the light guide plate 120, as described above, the projecting portions 220 are formed. The adhesive sheet 190 is arranged between upper surfaces of the projecting portion 220 and the flexible printed circuit board 160. The flexible printed circuit board 160 is fixed to the light guide plate 120 using the adhesive sheet 190 and hence, the positions of the LEDs 150 with respect to the light guide plate 120 are stabilized.

Further, by integrally forming the light guide plate 120 and the flexible printed circuit board 160 using the adhesive sheet 190, it is possible to confirm whether the LEDs 150 are arranged at accurate or proper positions with respect to the light incident surface 125 of the light guide plate 120 or not. That is, in case of a step in which the flexible printed circuit board 160 and the light guide plate 120 are separately mounted on the backlight 110, in an attempt to confirm the positions of the LEDs 150 with respect to the light incident surface 125 after storing respective parts in the backlight 110, other parts conceal the LEDs 150 and the light incident surface 125 and hence, the confirmation of the LEDs 150 becomes difficult.

Figure 7:
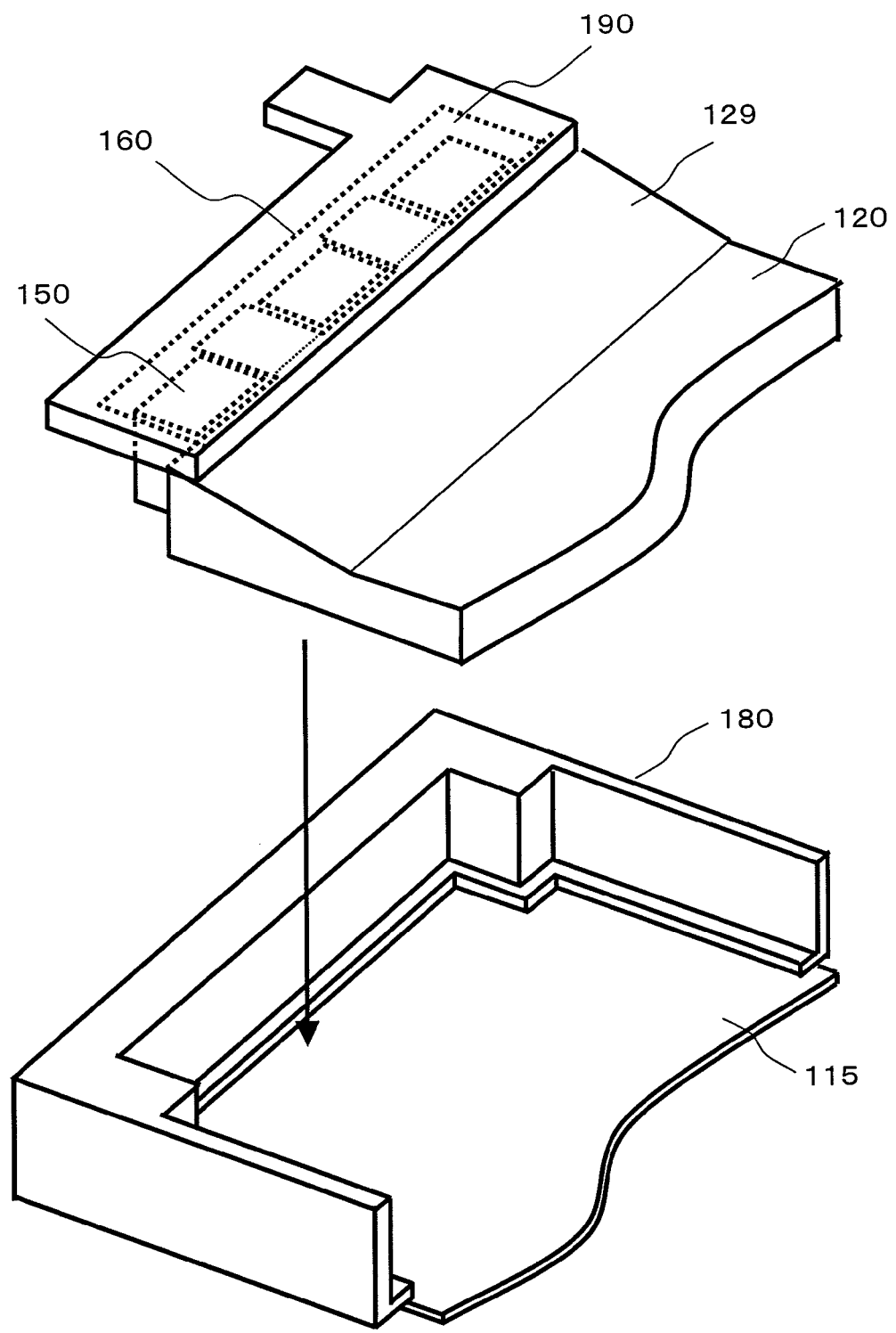
FIG. 7 is a schematic view showing a mounting method of the light guide plate of the liquid crystal display device of the embodiment according to the present invention.

Next, a step for mounting the part which is integrally formed of the light guide plate 120 and the flexible printed circuit board 160 on a mold 180 is explained in conjunction with FIG. 7. The mold 180 has the function as a storing portion of the backlight 110. The light guide plate 120 and the flexible printed circuit board 160 are stored and held in the inside of the mold 180.

Further, the mold 180 also has the function of preventing leaking of light and covers a periphery of the light guide plate 120. However, the mold 180 forms an opening in a liquid-crystal-panel side thereof and hence, light which is radiated from the backlight 110 is radiated to the liquid crystal panel.

First of all, the reflective sheet 115 is arranged on the mold 180. The light guide plate 120 and the flexible printed circuit board 160 are arranged on the reflective sheet 115. Here, as shown in FIG. 7, an opening may be formed in a bottom surface of the mold 180, and the reflective sheet 115 may be fixed to the outside of the opening using an adhesive material.

When the reflective sheet 115 is arranged to the outside of the opening of the mold 180, it is possible to form a space between the LED 150 and the reflective sheet 115. With the provision of such a space, it is possible to lower the possibility of occurrence of a drawback that the LED 150 and the reflective sheet 115 are brought into contact with each other attributed to the deformation of the LED 150 caused by the thermal expansion.

Figure 8:
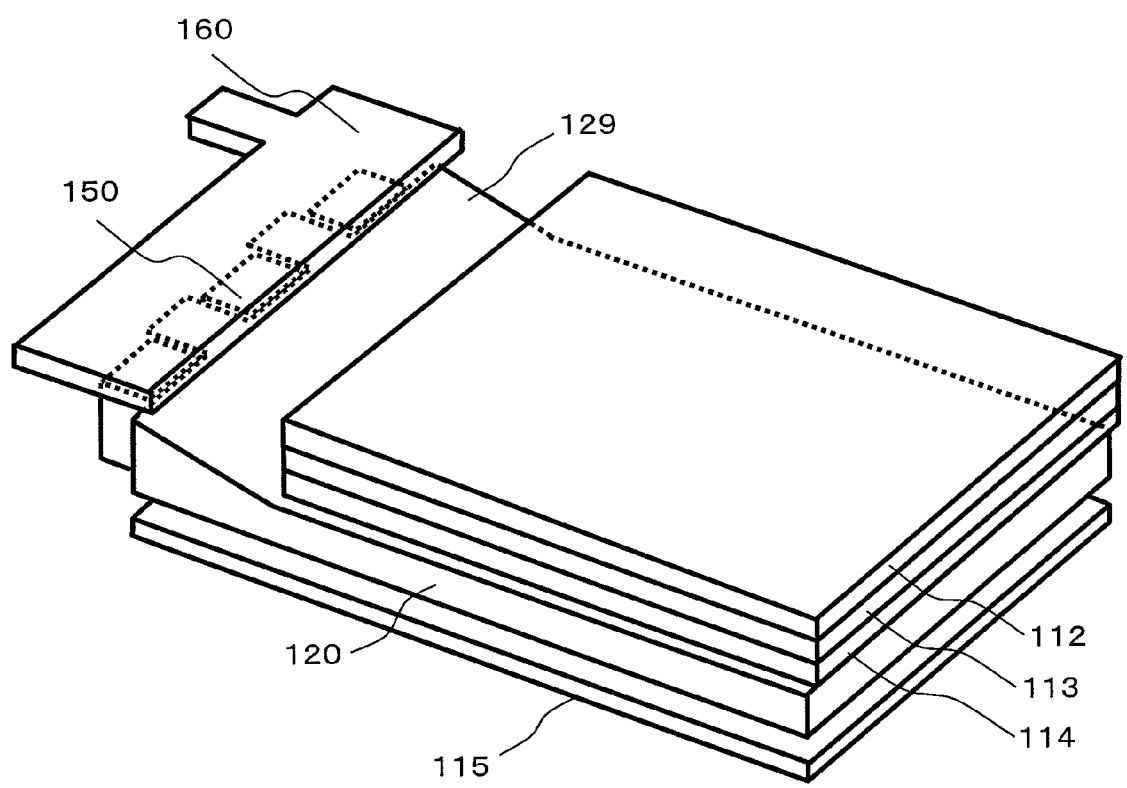
FIG. 8 is a schematic perspective view showing a backlight of the liquid crystal display device of the embodiment according to the present invention.

FIG. 8 shows a state in which the optical sheets such as the diffusion sheet 114, the lower prism sheet 113 and the upper prism sheet 112 are mounted on the light guide plate 120. The respective optical sheets are provided for effectively radiating light which is radiated from the light guide plate 120 to the liquid crystal panel, and are mounted on a light radiation surface of the light guide plate 120 in a sequentially overlapping manner.

The optical sheets are arranged in conformity with light radiated from the light radiation surface and hence, the respective optical sheets have the substantially same shape and the substantially same size as the light radiation surface of the light guide plate 120. That is, for lowering a manufacturing cost of a product, an area of the optical sheet to be used is required to be as small as possible. Accordingly, to achieve such an optical object, the optical sheets have the substantially same size as the light radiation surface of the light guide plate 120.

Figure 9:
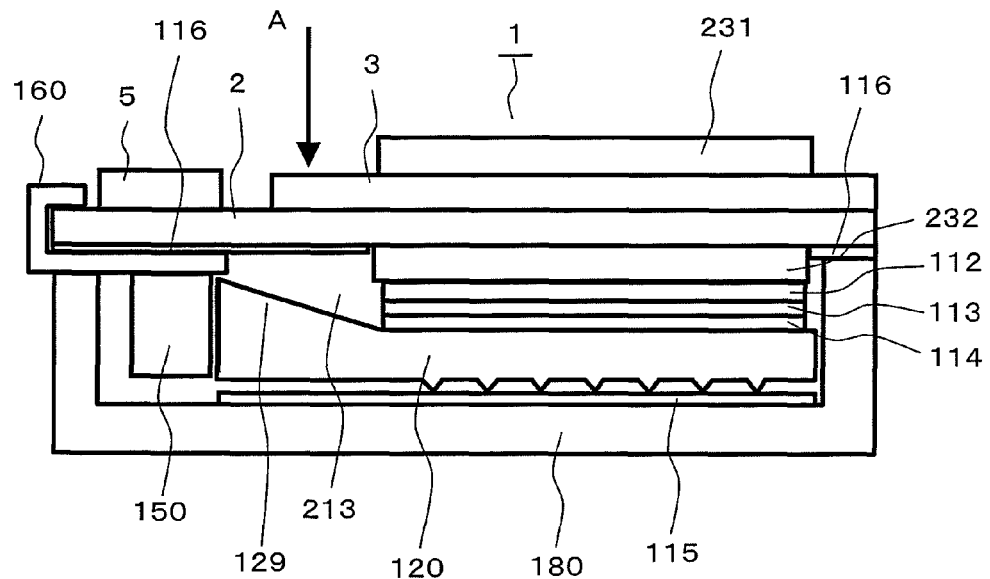
FIG. 9 is a schematic cross-sectional view showing the backlight of the liquid crystal display device of the embodiment according to the present invention.

Next, FIG. 9 is a cross-sectional view showing a state that the light guide plate 120 and the like are mounted on the mold 180 and the liquid crystal panel 1 is mounted on the light guide plate 120 and the like. The liquid crystal panel 1 is configured such that the TFT substrate 2 and the color filter substrate 3 overlap each other. An upper polarizer 231 and a lower polarizer 232 are arranged outside of the TFT substrate 2 and the color filter substrate 3.

A light blocking frame 116 is arranged between the liquid crystal panel 1 and the mold 180. With the use of the light blocking frame 116, it is possible to prevent undesired light from being incident on the liquid crystal panel 1 from the backlight 110. Further, by imparting the adhesiveness to the light blocking film 116, the mold 180 and the liquid crystal panel 1 may be fixed to each other.

FIG. 9 shows a state in which a force indicated by an arrow A is applied to the liquid crystal panel 1 from the outside. It is found that when the force indicated by the arrow A is applied to the liquid crystal panel 1, the TFT substrate 2 is easily broken in the vicinity of the inclination surface 129. It is considered that the above-mentioned drawback is attributed to a fact that there is no structure for supporting the TFT substrate 2 from below due to a gap 213 formed by the inclination surface 129.

Figure 10:
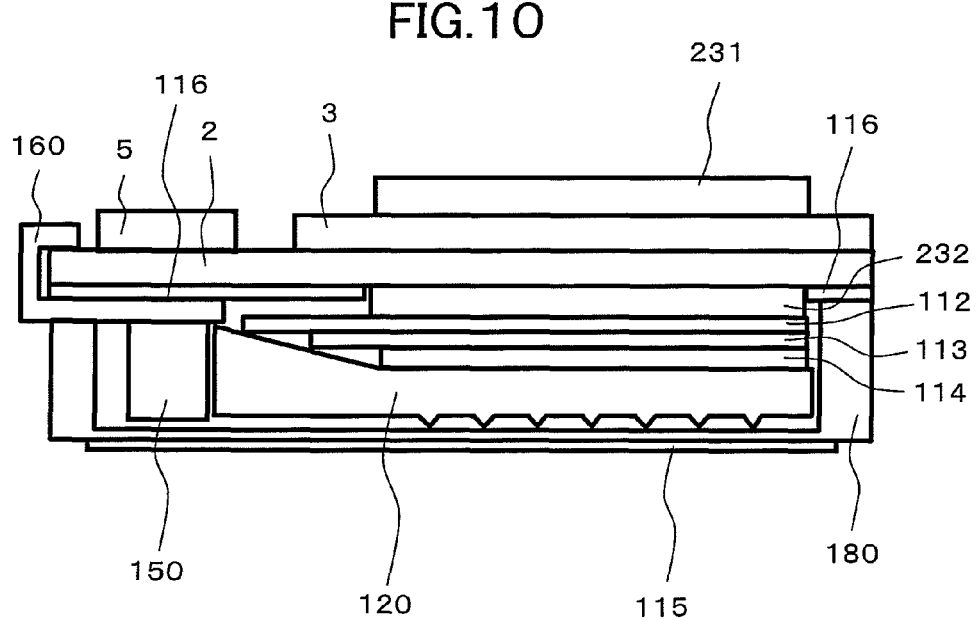
FIG. 10 is a schematic cross-sectional view showing the backlight of the liquid crystal display device of the embodiment according to the present invention.

Accordingly, as shown in FIG. 10, the optical sheets are arranged to overlap the inclination surface 129 so as to bury the gap 213. Although the diffusion plate 114 has the substantially same size as the light radiation surface of the light guide plate 120, the lower prism sheet 113 and the upper prism sheet 112 extend from the light radiation surface and overlap the inclination surface 129.

Even when the force indicated by the arrow A in FIG. 9 is applied to the liquid crystal panel 1, the TFT substrate 2 is supported on the lower prism sheet 113 and the upper prism sheet 112 from below and hence, it is possible to prevent the breakage of the TFT substrate 2.

Here, although the optical sheets extend to a lower side of the light blocking frame 116, the light is blocked by the light blocking frame 116 and hence, optical functions of portions of the optical sheets arranged below the light blocking frame 116 are useless. Accordingly, sheet-like parts may overlap the inclination surface 129 instead of the expensive optical sheets.

Here, the reflective sheet 115 is configured to be arranged inside the mold 180 in FIG. 9, while the reflective sheet 115 is configured to be arranged outside the mold 180 in FIG. 10. Both constitutions may be adopted. It is needless to say that the reflective sheet 115 may be arranged inside the mold 180 in FIG. 10.

By arranging the optical sheets such as the diffusion plate 114, the lower prism sheet 113 and the upper prism sheet 112 on the inclination surface 129 in an overlapping manner, it is possible to prevent the breakage of the liquid crystal panel 1. However, by arranging the optical sheets on the inclination surface 129 in an overlapping manner, light which is radiated from the inclination surface 129 propagates the optical sheet and becomes stray light thus giving rise to a drawback that the light transmission efficiency of the light guide plate 120 is lowered. That is, a ratio of a quantity of the light which is radiated from the backlight 110 and is radiated to the liquid crystal panel 1 with respect to a quantity of the light which is radiated from the LED 150 (utilization efficiency of light) is lowered.

Figure 11:
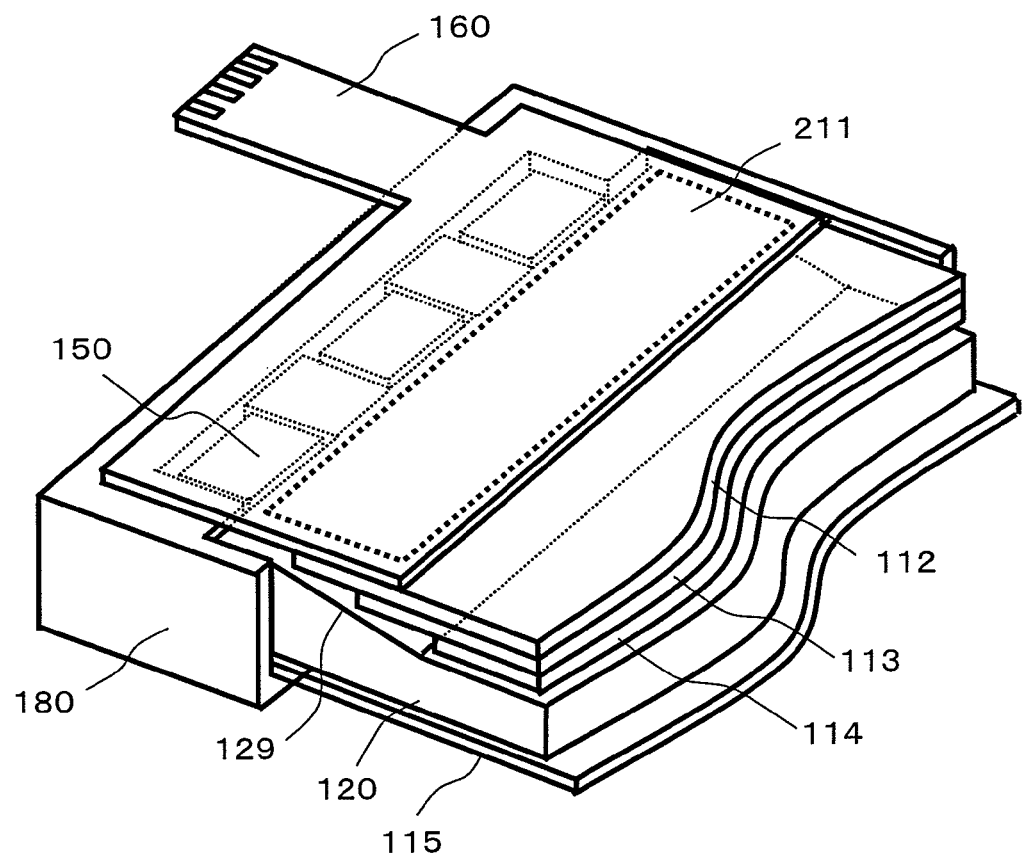
FIG. 11 is a schematic perspective view showing the backlight of the liquid crystal display device of the embodiment according to the present invention.

Accordingly, as shown in FIG. 11, the liquid crystal display device is configured such that a reflective member 211 is arranged on an optical sheet side of flexible printed circuit board 160 thus reflecting the light radiated from the inclination surface 129 by the reflective member 211 and returning to the light guide plate 120. In FIG. 11, a height of the inclination surface 129 is larger than a total thickness of the overlapped optical sheets and hence, the flexible printed circuit board 160 overlaps the optical sheets.

For example, when a thickness of the light guide plate 120 is set to 0.2 to 0.5 mm for reducing a thickness of the liquid crystal display device, a height of the inclination surface 129 becomes 0.05 to 0.15 mm and the total thickness of the overlapping optical sheets becomes 0.1 to 0.2 mm and hence, it is impossible to overlap the flexible printed circuit board 160 to the optical sheet.

Figure 12:
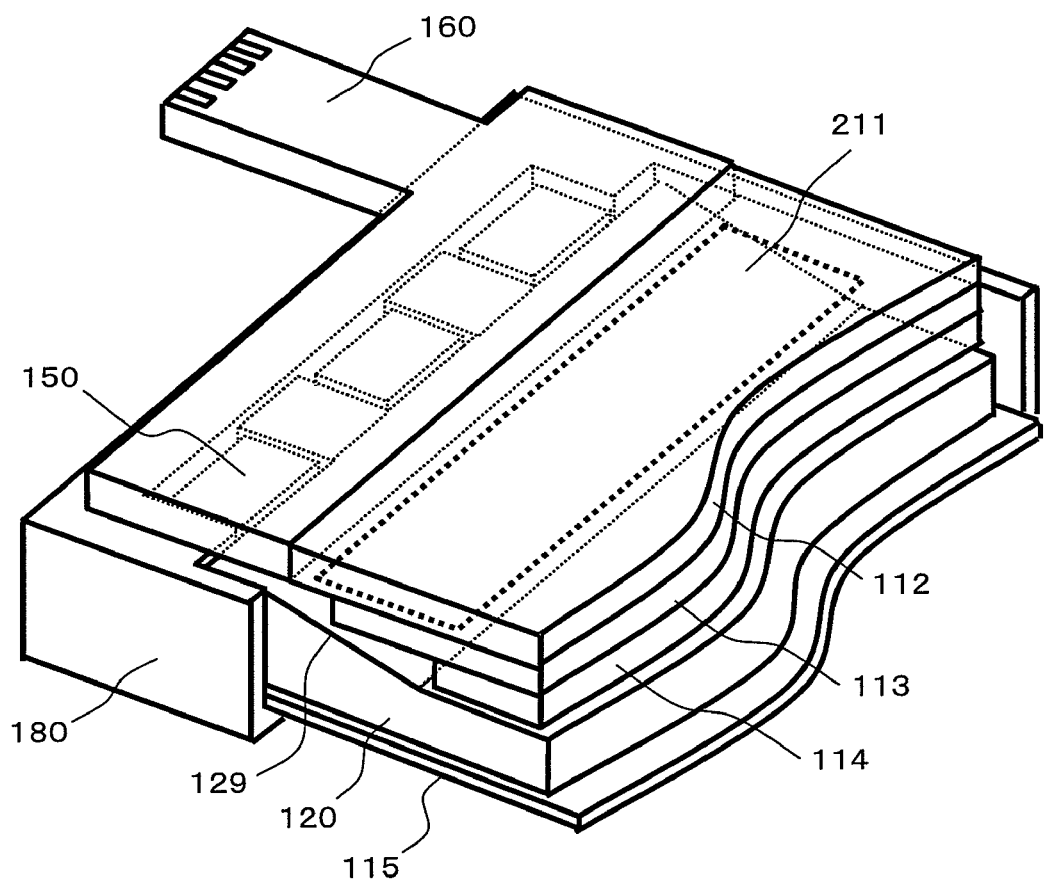
FIG. 12 is a schematic perspective view showing the backlight of the liquid crystal display device of the embodiment according to the present invention.

Accordingly, as shown in FIG. 12, the liquid crystal display device is configured such that the reflective member 211 is mounted on the optical-sheet side of the flexible substrate 160, and the optical sheet and the flexible printed circuit board 160 have made end portions thereof abut to each other at end portions thereof. Here, the reflective member 211 may also be formed on the flexible printed circuit board 160.

Figure 13:
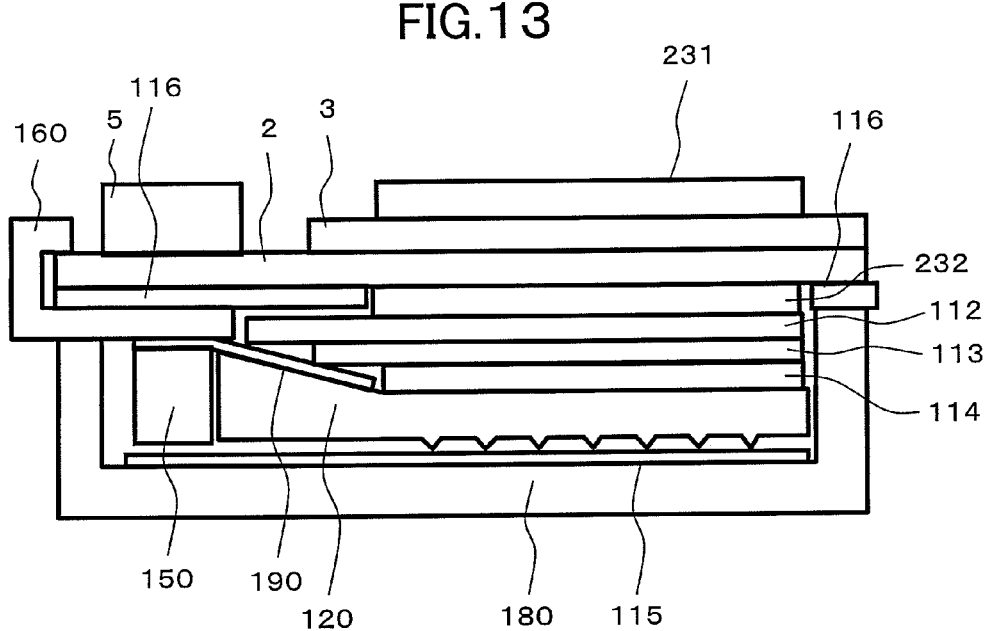
FIG. 13 is a schematic cross-sectional view showing the backlight of the liquid crystal display device of the embodiment according to the present invention.

Next, FIG. 13 shows the constitution in which the reflective member 211 is mounted on the adhesive sheet 190 which connects the flexible printed circuit board 160 and the projecting portion 220 of the light guide plate 120 by adhesion. As shown in FIG. 13, the adhesive sheet 190 extends to the inclination surface 129 from the flexible printed circuit board 160 side, and the reflective member 211 is formed on a portion which overlaps the inclination surface 129.

Figure 14:
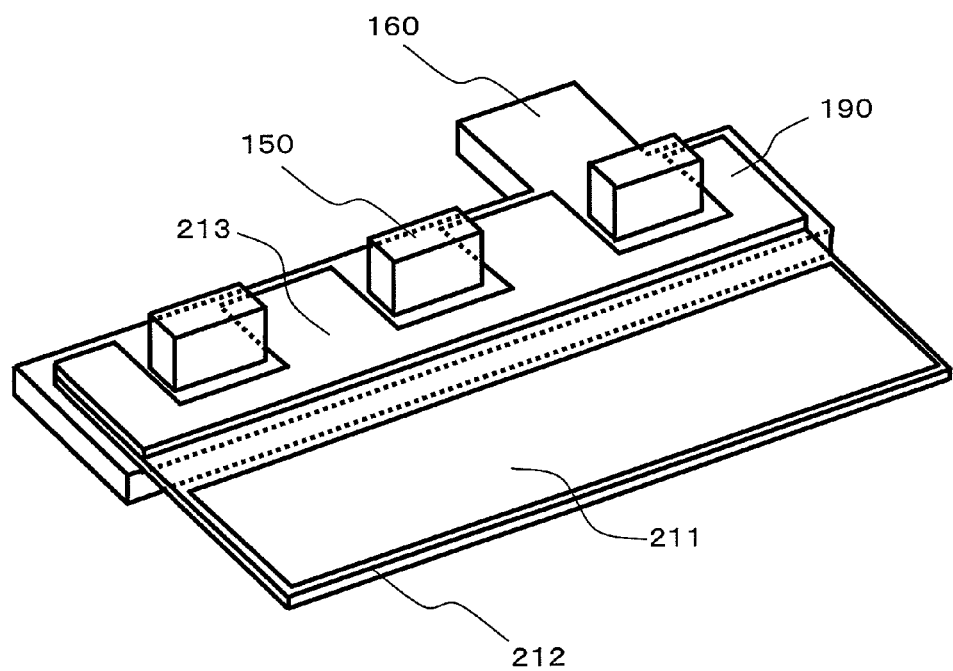
FIG. 14 is a schematic perspective view showing an adhesive sheet of the liquid crystal display device of the embodiment according to the present invention.

The detail of the adhesive sheet 190 which is used in the constitution shown in FIG. 13 is shown in FIG. 14. The adhesive sheet 190 is provided to adhere the light guide plate 120 to a surface of the flexible printed circuit board 160. The adhesive sheet 190 is configured such that an adhesive material 213 is applied to a base film 212 which constitutes a base material. By applying the adhesive material 213 to a portion of the base film 212 which is adhered to the light guide plate 120, the base film 212 extends to the light guide plate 120 side.

Figure 15:
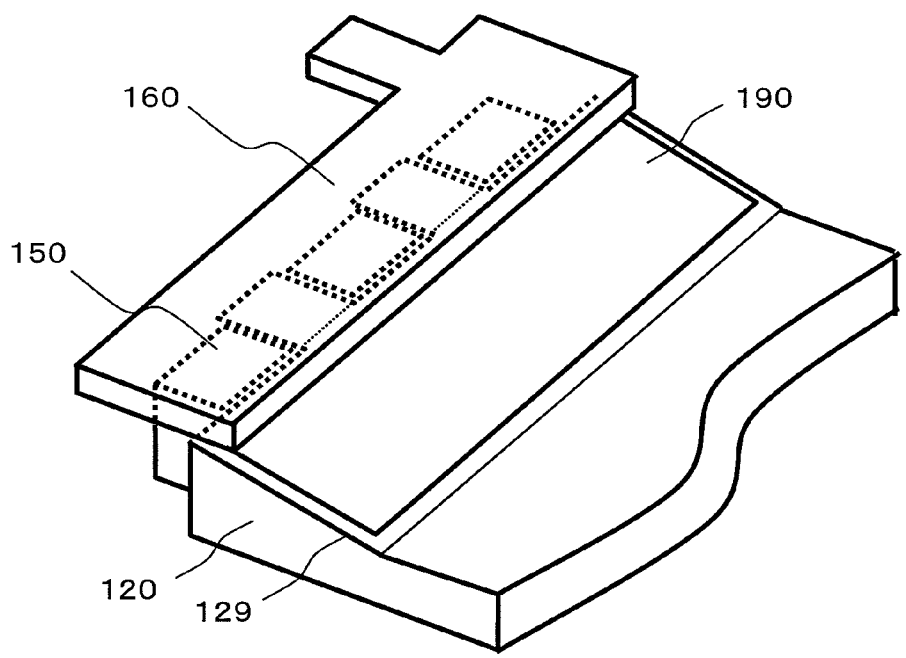
FIG. 15 is a schematic perspective view showing the adhesive sheet of the liquid crystal display device of the embodiment according to the present invention.

By arranging the reflective member 211 on an extending portion of the flexible base film 212, as shown in FIG. 15, the reflective member 211 is arranged along the inclination surface 129. By arranging the reflective member 211 in the vicinity of the inclination surface 129, the light which is radiated from the inclination surface 129 efficiently returns to the light-guide-plate-120 side.

As the reflective member 211, a material having a high reflectance may be used. For example, a white paint, silver or a material corresponding to silver may be used.

Figure 16:
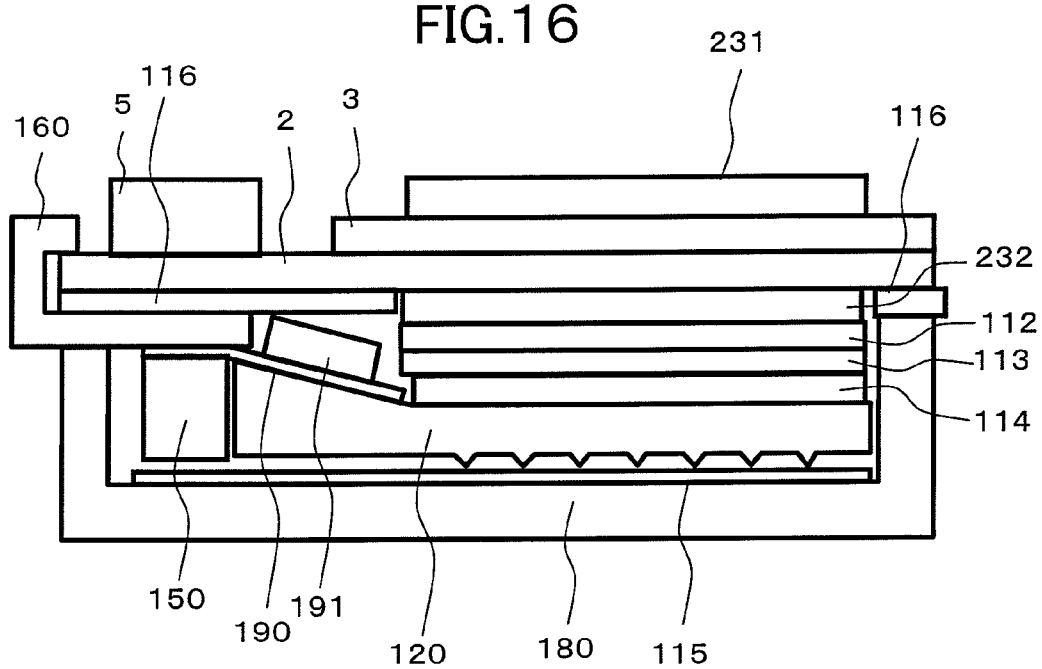
FIG. 16 is a schematic cross-sectional view showing the backlight of the liquid crystal display device of the embodiment according to the present invention.

Next, FIG. 16 shows the constitution which prevents the breakage of the liquid crystal panel 1 by arranging a cushion member 191 on a portion of the adhesive sheet 190 which overlaps the inclination surface 129. As the cushion member 191, a low cost material may be used instead of a material which is formed by adopting a particular manufacturing method such as an optical sheet.

What is claimed is:

1. The light guide plate includes:
   a main surface from which light is radiated,
   a light incident surface which intersects the main surface, a bottom surface which is opposite the main surface,
   a projecting portion is extended from the light incident surface in a state that the projecting portion projects from the light incident surface along the side surface of the light emitting element, and
   an inclination surface which has a thickness thereof decreased as the inclination surface extends toward a main surface side from a light incident surface side,
   an optical sheet is arranged on the inclination surface, and a printed circuit board on which the light emitting element is mounted is adhered to the light guide plate using an adhesive material formed on the projecting portion,
   wherein a height of light emitting element exceeds a distance between the bottom surface and the main surface of the light guide plate.

2. A liquid crystal display device according to claim 1, wherein the light emitting element is an LED.

3. A liquid crystal display device according to claim 1, wherein a reflective member is formed on the optical sheet which is arranged on the inclination surface.

4. the light guide plate includes:
   an upper surface is arranged to face the liquid crystal panel in an opposed manner,
   a side surface which intersects the upper surface, and
   a bottom surface is opposite the upper surface; and
   a projecting portion is extended from the side surface and is arranged close to the plurality of the light emitting elements, and
   an inclination surface is formed in a state that the inclination surface extends toward the upper surface from the side surface of the light guide plate, an optical sheet is arranged on the inclination surface, and a reflective member is arranged on the optical sheet, the printed circuit board is arranged on the projecting portion, wherein heights of the plurality of the light emitting elements exceed a distance between the bottom surface and the upper surface of the light guide plate.

5. A liquid crystal display device according to claim 4, wherein the plurality of the light emitting elements are LEDs.

6. A liquid crystal display device according to claim 4, wherein an adhesive material is provided between the projecting portion and the printed circuit board.

7. the light guide plate includes a light incident surface, which is arranged close to the plurality of the light emitting elements, an upper surface from which the incident light is radiated, and a bottom surface that which is opposite the upper surface, an inclination surface which has a thickness thereof decreased as the inclination surface extends toward the upper surface from the light incident surface, the plurality of the light emitting elements are arranged in the direction along a side surface of the printed circuit board, a projecting portion is extended from the light incident surface and is formed between two neighboring light emitting elements, an adhesive material is applied to an upper surface of the projecting portion, and a printed circuit board is adhered to the projecting portion, wherein heights of the plurality of the light emitting elements exceed a distance between the bottom surface and the upper surface of the light guide plate.

8. A liquid crystal display device according to claim 7, wherein the plurality of the light emitting elements are LEDs.

* * * * *